United States Patent
Cai et al.

(10) Patent No.: US 8,630,845 B2
(45) Date of Patent: *Jan. 14, 2014

(54) GENERATING SNIPPET FOR REVIEW ON THE INTERNET

(75) Inventors: Keke Cai, Beijing (CN); HongLei Guo, Beijing (CN); Zhong Su, Beijing (CN); Hui Jia Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/599,309

(22) Filed: Aug. 30, 2012

(65) Prior Publication Data

US 2012/0323563 A1  Dec. 20, 2012

Related U.S. Application Data

(63) Continuation of application No. 13/456,962, filed on Apr. 26, 2012.

(30) Foreign Application Priority Data

Apr. 29, 2011 (CN) .......................... 2011 1 0110409

(51) Int. Cl.
G06F 17/27 (2006.01)
G06F 17/28 (2006.01)
G06F 17/20 (2006.01)
G06F 17/21 (2006.01)
G10L 21/00 (2013.01)

(52) U.S. Cl.
USPC .......... 704/9; 704/4; 704/8; 704/10; 704/270; 704/270.1; 704/277; 704/275

(58) Field of Classification Search
USPC ............ 704/9, 10, 4, 8, 270, 270.1, 277, 275
See application file for complete search history.

(56) References Cited

U.S. PATENT DOCUMENTS

| | | | |
|---|---|---|---|
| 6,963,848 B1 * | 11/2005 | Brinkerhoff | 705/7.32 |
| 7,363,214 B2 * | 4/2008 | Musgrove et al. | 704/9 |
| 7,430,552 B2 * | 9/2008 | Cameron et al. | 1/1 |
| 7,509,230 B2 * | 3/2009 | Fernandez et al. | 702/179 |
| 7,523,085 B2 * | 4/2009 | Nigam et al. | 706/55 |
| 7,558,769 B2 | 7/2009 | Scott et al. | |
| 7,937,265 B1 * | 5/2011 | Pasca et al. | 704/9 |

(Continued)

OTHER PUBLICATIONS

M. Hu and B. Liu, "Mining and summarizing customer reviews," in Proceedings of the ACM SIGKDD Conference on Knowledge Discovery and Data Mining (KDD), pp. 168-177, 2004.*

(Continued)

Primary Examiner — Edgar Guerra-Erazo
(74) Attorney, Agent, or Firm — Cantor Colburn LLP (57) ABSTRACT

A method and system for generating snippet for review on the Internet. The method includes the steps of: receiving a review and a set of feedbacks corresponding to the review, where the review includes a plurality of evaluating sentences that evaluates product features of a product; calculating support degrees of each of the plurality of evaluating sentences by using the set of feedbacks; extracting, by relying on calculated support degrees of each of the evaluating sentences, at least one of the evaluating sentences from the plurality of evaluating sentences; and designating extracted evaluating sentence as a snippet of the review; where at least one of the steps is carried out by using a computer device.

9 Claims, 3 Drawing Sheets

(56) References Cited

U.S. PATENT DOCUMENTS

| | | |
|---|---|---|
| 2004/0078214 A1* | 4/2004 | Speiser et al. .................... 705/1 |
| 2005/0091038 A1* | 4/2005 | Yi et al. .......................... 704/10 |
| 2005/0125216 A1* | 6/2005 | Chitrapura et al. ............... 704/1 |
| 2006/0085248 A1* | 4/2006 | Arnett et al. .................... 705/10 |
| 2006/0200341 A1* | 9/2006 | Corston-Oliver et al. ........ 704/5 |
| 2006/0200342 A1* | 9/2006 | Corston-Oliver et al. ...... 704/10 |
| 2006/0212897 A1* | 9/2006 | Li et al. ........................... 725/32 |
| 2007/0078671 A1 | 4/2007 | Dave et al. |
| 2007/0143122 A1* | 6/2007 | Holloway et al. ................. 705/1 |
| 2007/0214000 A1* | 9/2007 | Shahrabi et al. ................. 705/1 |
| 2008/0097758 A1* | 4/2008 | Li et al. ......................... 704/240 |
| 2008/0109232 A1 | 5/2008 | Musgrove et al. |
| 2008/0215571 A1 | 9/2008 | Huang et al. |
| 2008/0249762 A1* | 10/2008 | Wang et al. ....................... 704/9 |
| 2008/0249764 A1* | 10/2008 | Huang et al. ..................... 704/9 |
| 2008/0313180 A1* | 12/2008 | Zeng et al. ........................ 707/6 |
| 2009/0193011 A1 | 7/2009 | Blair-Goldensohn et al. |
| 2009/0319342 A1 | 12/2009 | Shilman et al. |
| 2010/0023311 A1* | 1/2010 | Subrahmanian et al. ......... 704/2 |
| 2010/0169317 A1 | 7/2010 | Wang et al. |
| 2010/0185569 A1* | 7/2010 | Hu et al. ......................... 706/12 |

OTHER PUBLICATIONS

Wang, et al., "Feature-based Customer Review Mining" published Sep. 5, 2008 at <<http://nlp.stanford.edu/courses/cs224n/2007/fp/johnnyw-hengren.pdf>>, Department of Computer Science Stanford University, pp. 1-9.*

Huang et al., "Improving product review search experiences on general search engines," Proceedings of the 11th International Conference on electronic Commerce, pp. 107-116, Aug. 12-15, 2009. Taipei, Taiwan.

* cited by examiner

GENERATING SNIPPET FOR REVIEW ON THE INTERNET

CROSS-REFERENCE TO RELATED APPLICATION

This application is a continuation of and claims priority from U.S. patent application Ser. No. 13/456,962, filed Apr. 26, 2012, which in turn claims priority under 35 U.S.C. §119 from Chinese Patent Application No. 201110110409.5 filed Apr. 29, 2011, the entire contents of both are incorporated herein by reference.

BACKGROUND OF THE INVENTION

1. Field of the Invention

The present invention relates to data analysis techniques. More particularly, the present invention relates to a method and system for generating snippet for reviews on the Internet.

2. Description of Related Art

The spread of E-commerce on the Internet provides convenience to people's lives. On the Internet, people can review the products and services provided by merchandise providers. These reviews offer valuable information for: (1) providers who want to improve their services; and (2) for consumers to select appropriate purchases.

People review various aspects of products or services on the Internet. Within an aspect, there are different reviews, and each review can contain comments having various perspectives. However, even if the review is comprehensive, the comments in the review do not necessarily represent all aspects of products and services.

The Internet contains a large amount of product and service reviews. Due to the large amount, there is a need to locate comment contents within numerous reviews that have certain credibility on various aspects of the products and services.

SUMMARY OF THE INVENTION

Accordingly, one aspect of the present invention provides a method of generating snippet for review on the Internet, the method including the steps of: receiving a review and a set of feedbacks corresponding to the review, where the review includes a plurality of evaluating sentences that evaluates product features of a product; calculating support degrees of each of the plurality of evaluating sentences by using the set of feedbacks; extracting, by relying on calculated support degrees of each of the evaluating sentences, at least one of the evaluating sentences from the plurality of evaluating sentences; and designating extracted evaluating sentence as a snippet of the review; where at least one of the steps is carried out by using a computer device.

Another aspect of the present invention provides a system for generating snippet for review on the Internet, the system including: a receiving module configured to receive a review and a set of feedbacks corresponding to the review, where the review includes a plurality of evaluating sentences that evaluates product features of a product; a support degree calculating module configured to calculate support degrees of each of the plurality of evaluating sentences by using the set of feedbacks; and a snippet generating module configured to: (1) extract, by relying on calculated support degrees of each of the evaluating sentences, at least one of the evaluating sentences from said plurality of evaluating sentences; and (2) designate extracted evaluating sentence as a snippet of the review.

BRIEF DESCRIPTION OF THE DRAWINGS

The features, advantages and other aspects of respective embodiments of the invention will become more apparent from the following detailed descriptions, with reference to the accompanying drawings, and several embodiments of the invention are shown here by way of illustration without limitation.

DETAILED DESCRIPTION OF THE PREFERRED EMBODIMENTS

The flow charts and block diagrams in the drawings illustrate the achievable architecture, functions, and operations of a system, method and computer program product in accordance with various embodiments of the invention. At this point, each block in the flow charts or block diagrams can represent a part of a module, a program segment or codes, which contains one or more executable instructions for realizing specified logic function. It should also be noted that, in some alternative implementations, the functions indicated in the blocks can occur at different orders from the one indicated in the drawings. For example, two subsequently expressed blocks can be actually executed substantially in parallel, and sometimes in reverse order, which depends on the related functions. It should also be noted that, each block in the block diagrams and/or flow charts, as well as a combination of blocks in the block diagrams and/or flow charts, can be realized by a dedicated hardware-based system performing a specified function or operation, or by a combination of the dedicated hardware and computer instructions.

In the following, the principle and spirits of the invention will be described with reference to several exemplary embodiments. It should be understood that, these embodiments are given only for those skilled in the art to better understand and thus implement the invention, and by no means to limit the scopes of the invention in any way.

In the following, embodiments of the invention will be described in detail with reference to the drawings.

The specification generally relates to generating snippet on the features of a product for a review on basis of the feedbacks on the review. The product here generally refers to any of tangible and intangible products that can be purchased by consumers, such as cars, handsets, travelling services, booking services, and so on. The features of a product refer to the product-related concepts appeared in the review, for example, for a particular product of handset, its features include screen size, battery capacity, etc., and for a particular product of travelling service, its features include travelling time, safety, comfort, etc.

The inventor believes that it can facilitate improvement of the credibility of a generated snippet for a product review by generating the snippeton the basis of feedbacks on the product review by other users such that the generated snippet can reflect the overall comments of other users. To this end, respective embodiments of the invention provide a computer-implemented method and apparatus and a computer program product for generating snippet for reviews on the Internet.

In one aspect, a computer-implemented method for generating snippet for reviews on the Internet is provided, the method comprising: receiving a review and a set of feedbacks on the review, where the review includes a plurality of evaluating sentences for evaluating product features of a product; calculating support degrees of each of the plurality of evaluating sentences by the set of feedbacks; and extracting one or more evaluating sentences from the plurality of evaluating sentences as a snippet of the review on the basis of the calculated support degrees of each of the evaluating sentences.

In another aspect, a system for generating snippet for review on the Internet is provided, the system comprising: a receiving means configured to receive a review and a set of feedbacks on the review, where the review includes a plurality of evaluating sentences for evaluating product features of a product; a support degree calculating means configured to calculate support degrees of each of the plurality of evaluating sentences by the set of feedbacks; a snippet generating means configured to extract one or more evaluating sentences from the plurality of evaluating sentences as a snippet of the review on the basis of the calculated support degrees of each of the evaluating sentences.

Figure 1:
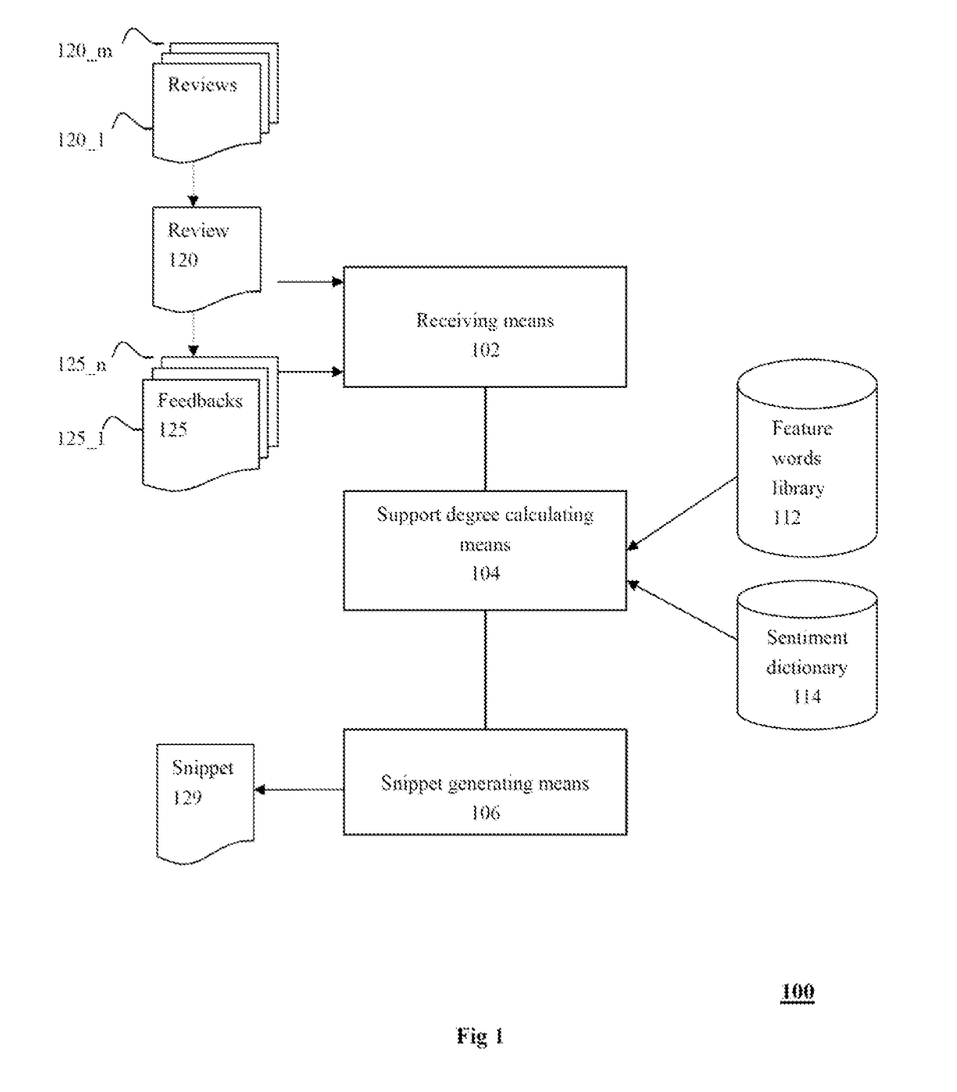
FIG. 1 schematically shows a block diagram of architecture of a system in accordance with an embodiment of the present invention.

First, FIG. 1 schematically shows a block diagram of architecture of a system in accordance with one embodiment of the invention.

A system 100 for generating snippet for reviews on the Internet according to an embodiment as shown in FIG. 1 includes a receiving means 102, a support degree calculating means 104, and a snippet generating means 106.

The receiving means 102 is configured to receive a review and a set of feedbacks on the review, where the review contains a plurality of evaluating sentences for evaluating the product features of a product.

Reviews on the product and feedbacks on the reviews are widespread on the Internet. For example, reviews frequently appear in many popular blogs and micro-blogs. Regular product reviews are usually long and are relatively comprehensive. Each product review usually can attract many feedbacks from other users, who provide opinions on the viewpoints of the product review. These opinions are generally straightforward, short, and pithy.

The review received by the receiving means 102, for example, can be provided by a search engine (not shown in the figure) in response to search by a user for reviews on a product. In general, the search engine can search out a plurality of reviews 120_1 ... 120_m on the same product. The review received by the receiving means 102 is one 120 of the plurality of reviews.

For example, a review 120 on a handset connected to the Internet is provided as follows:

TABLE 1

| Review 120 |
| --- |
| Recently I bought a Y-Model handset of Company X newly coming into the market, and after having used it for half a month, I finally find out its "temper" and can like to say something about it here. |
| Its looking is very nice, the desktop and hidden shortcuts are great, although it has a resistive touch screen, the sensitivity is high, the resolution is OK, the sound during conversation is loud, the sound quality is good, the earphone effect is very good, the display effect of the screen is well, the pictures are bright, it has WIFI and 3G which make the Internet-access easy and fast. |
| The system is not stable, sometimes the programs end automatically, and occasionally crash, but without big troubles; the photo-taking is not good, which can be due to lacking flash; the battery capacity is only 1000 mA |

TABLE 1-continued

| Review 120 |
| --- |
| which is too small; it is unacceptable that it has no gravity-sensing and has so few application software. |
| Overall, this handset is pretty good, after all it is just a middle-end machine, it is natural that it has no such high configuration, and it can meet the use of ordinary people. It is a good choice for low-income people, students and so on. Anyway, you get what you pay for, the performance-price ratio is reasonable and I like this handset very much. |

Generally, for a review on the Internet, other users provide feedbacks 125_1 ... 125_n made by other users, and these feedbacks can also be provided by the search engine. Table 2 exemplarily represents a set of feedbacks on the review 120 shown in Table 1, and the set of feedbacks has 28 feedbacks (125_1 ... 125_28). These feedbacks are collectively referred to as feedback 125 shown below:

TABLE 2

| Feedback 125 | |
| --- | --- |
| Serial No. | Feedbacks |
| 125_1 | The tactile impression of the handset is very good, and the hand feeling is not bad when holding. |
| 125_2 | I think the appearance of the handset has been obviously improved, and the hand feeling is very good. |
| 125_3 | The appearance is very fine and compact, and the hand feeling is not bad. |
| 125_4 | I like its profile. |
| 125_5 | My photo taken by it is very clear, being comparable with a camera. |
| 125_6 | I think the photo taken by it is fairly clear. |
| 125_7 | Although its photo-taking is not so convenient, the effect of photo-taking is OK. |
| 125_8 | No flash, however this will not influence its daily use, who will take pictures with a handset in the night? |
| 125_9 | The battery is too bad, it can only maintain about 2 hrs for Internet access. |
| 125_10 | The battery is also not durable. |
| 125_11 | The standby time of the battery is too short. |
| 125_12 | The battery is not enough. |
| 125_13 | The battery is significantly not durable. Last night I charged it for the whole night but the power is exhausted in less than 2 hrs, depressed. |
| 125_14 | The sound of the earphone is very low. |
| 125_15 | The sound quality is good when making a call. |
| 125_16 | The performance-price ratio is reasonable. |
| 125_17 | The performance-price ratio is high, and it is worth buying. |
| 125_18 | Students purchase it more, thinking highly of its performance-price ratio. |
| 125_19 | The display of the screen is very good. |
| 125_20 | The resolution of the screen is fair. |
| 125_21 | The screen is big, and it looks very comfortable with Yahei font. |
| 125_22 | Its response is slow, the screen occasionally blurs for short-time. |
| 125_23 | Insensitive and the response of the system is somewhat slow. |
| 125_24 | I think it is not that slow as someone says. |
| 125_25 | I think the performance is good enough and not slow at all. |
| 125_26 | The response is very sensitive and the speed is super fast. |
| 125_27 | Software cannot be installed too much, and the maintenance is inconvenient. |
| 125_28 | Many software are not supported. |

Turning back to FIG. 1, the support degree calculating means 104 is configured to calculate the support degree of each of the plurality of evaluating sentences by the set of feedbacks.

According to one embodiment of the invention, the support degree calculating means 104 can use a pre-defined feature word library 112 and/or a sentiment dictionary 114 during operation. This will be described below in more detail.

The snippet generating means 106 is configured to extract one or more evaluating sentences from the plurality of evaluating sentences as snippet 129 of the review on the basis of the calculated support degree of each evaluating sentence.

The architecture and operating environment of the system 100 in accordance with the embodiment of the invention has been generally explained as above. The system 100 and the functions of the means contained therein will be further set out in more details in the following description.

In the following, a computer-implemented method for generating snippet for review on the Internet in accordance with an embodiment of the invention will be illustrated with reference to FIG. 2.

Figure 2:
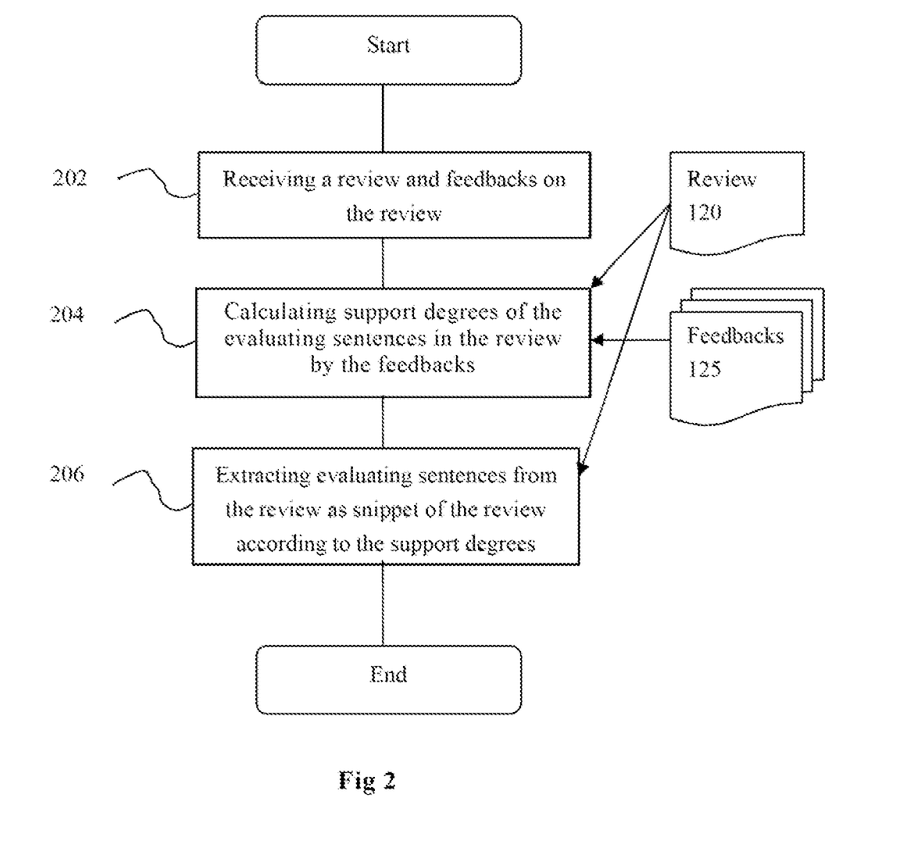
FIG. 2 schematically shows a flow chart of a method in accordance with an embodiment of the present invention.

As shown in FIG. 2, firstly in step 202, a review and a set of feedbacks on the review are received, where the review contains a plurality of evaluating sentences for evaluating product features of a product.

The contents shown in Table 1 as above can be taken as an example of the review received in step 202. The review 120 shown in Table 1 contains a plurality of evaluating sentences, such as "its looking is very nice", "the display effect of the screen is well", and "the battery capacity is only 1000 mA which is too small". They are used to evaluate the handset features of "appearance", "screen", and "battery", respectively.

An example of the set of feedbacks received in step 202 is shown in Table 2 above, where each feedback in the set of feedbacks 125 makes further reviews on the product features mentioned in the review 120.

In step 204, a support degree of each of the plurality of evaluating sentences by the set of feedbacks is calculated.

For example, there is an evaluating sentence of "its looking is very nice" in the review 120 shown in Table 1. In the set of feedbacks 125 shown in Table 2, following feedbacks apparently support the evaluating sentence of "its looking is very nice" in the review 120: "The tactile impression of the handset is very good, and the hand feeling is not bad when holding" (feedback 125_1), "I think the appearance of the handset has been obviously improved, and the hand feeling is very good" (125_2), "The appearance is very fine and compact, and the hand feeling is not bad" (125_3), and "I like its profile" (125_4). That is to say, in the overall 28 feedbacks, there are 4 feedbacks supporting the evaluating sentence of "its looking is very nice".

The support degrees of the other evaluating sentences by the set of feedback can be similarly calculated.

There can be many ways to measure the support degree. A simple way is to use the number of the feedbacks supporting a certain evaluating sentence to represent the support degree. It should be noted that, the support degree of the evaluating sentence can also be measured with other criteria in practice. This will be further discussed in the following.

In step 206, one or more evaluating sentences are extracted from the plurality of evaluating sentences on the basis of the calculated support degree of each evaluating sentence as snippet 129 of the review.

For example, according to the calculation in step 204, the following evaluating sentences in the review 120 shown in Table 1 have higher support degrees: "the battery capacity is only 1000 mA which is too small", "its looking is very nice", "the display effect of the screen is not bad", and "the performance-price ratio is reasonable". Accordingly, the above evaluating sentences can be extracted as the snippet of the review, i.e.

---

The battery capacity is only 1000 mA which is too small, its looking is very nice, the display effect of the screen is not bad, the performance-price ratio is reasonable.

Steps 202, 204, and 206 of the method flow shown in FIG. 2 can be realized by the receiving means 102, the support degree calculating means 104, and the snippet generating means 106 in the system 100 shown in FIG. 1. Also, the generated snippet 129 can be used by the search engine, which can display the snippet 129 while displaying the searched product review 120 in response to users' product review on a particular product.

In the following, various embodiments of the method shown in FIG. 2 will be further illustrated in combination with FIGS. 3 and 4, and thus to facilitate understanding details of various possible embodiments of each means shown in FIG. 1.

Figure 3:
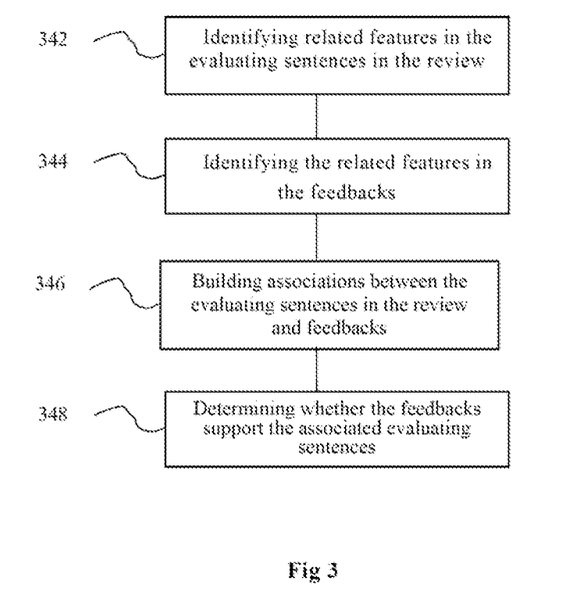
FIG. 3 schematically shows a flow chart of a method in accordance with another embodiment of the present invention.

According to one embodiment of the invention, the step of calculating the support degree of each of the plurality of evaluating sentences by the set of feedbacks 204 as shown in FIG. 2 can be realized by steps 342-348 shown in FIG. 3.

As shown in FIG. 3, in step 342, the related product feature in each evaluating sentence is identified.

Taking the review 120 shown in Table 1 as an example, the results of step 342 are shown in columns 2 and 3 of Table 3 below. For example, the evaluating sentence 1 "Its looking is very nice" relates to product feature of "profile", and the evaluating sentence 2 "the desktop and hidden shortcuts are great" relates to product feature of "shortcut".

The review 120 is the one on the particular product of handsets. It is shown by the feature words listed in the column 3 of Table 3 that, the product features related to the evaluating sentences of the review that can be indentified comprise: profile, shortcut, sensitivity, resolution, sound, sound quality, earphone, screen, picture, Internet access, performance, program, photo-taking, battery, gravity sensing, performance-price ratio, and application software.

TABLE 3

Review 120: Related Product Features in the Evaluating Sentences and Corresponding Complimentary/Critical Polarities

| Serial No. | Evaluating Sentence | Feature Word | Complimentary/ critical polarity |
|---|---|---|---|
| 1 | Its looking is very nice | Profile | Positive |
| 2 | the desktop and hidden shortcuts are great | Shortcut | Positive |
| 3 | although it has a resistive touch screen, the sensitivity is high | Sensitivity | Positive |
| 4 | the resolution is OK | Resolution | Positive |
| 5 | the sound during conversation is loud | Sound | Positive |
| 6 | the sound quality is good | Sound quality | Positive |
| 7 | the effect of the earphone is very good | Earphone | Positive |
| 8 | the display effect of the screen is not bad | Screen | Positive |
| 9 | the pictures are bright | Picture | Positive |
| 10 | it has WIFI and 3G which make the Internet-access easy and fast | Internet access | Positive |
| 11 | The system is not stable, sometimes the programs end automatically, and occasionally crash, but without big troubles | Performance | Negative |
| 12 | the photo-taking is not good, which canbe due to lacking flash | Photo-taking | Negative |
| 13 | the battery capacity is only 1000 mA which is too small | Battery | Negative |

TABLE 3-continued

Review 120: Related Product Features in the Evaluating Sentences
and Corresponding Complimentary/Critical Polarities

| Serial No. | Evaluating Sentence | Feature Word | Complimentary/ critical polarity |
|---|---|---|---|
| 14 | it is unacceptable that it has no gravity-sensing | Gravity Sensing | Negative |
| 15 | has so few application software | Software | Negative |
| 16 | Anyway, you get what you pay, the performance-price ratio is reasonable and I like this handset very much | Performance-price ratio | Positive |

In the following, it will be described how to identify the related product features in the evaluating sentences of the review.

In prior art, there are existed various methods for identifying the related product features in the evaluating sentences in the product review.

A common method is that, prior to identifying product feature words in the product review, firstly carrying out pre-processing to extract feature words from the specification of the product to which the product review relates, so as to create a feature words library. For example, in the specification of a handset, the feature words, such as "screen", "battery standby time", "software", and the like, can be found and stored in the feature words library 112.

Feature words in the feature words library not only can be extracted from the product specification, but also can be expanded on the basis of the product reviews already existed on the network.

For example, the feature words contained in the review can be extracted according to the semi-structured sentences in the review. For example, if there are following semi-structured sentences in the review:
  Advantages:
  The screen is clear.
  Disadvantages:
  The standby time is short;
  The sound quality is poor,
  then the feature words of "screen", "standby time", and "sound quality" can be extracted.

Moreover, the feature words can also be extracted using grammatical relationships.

For example, if it is already known that there has a feature word on one side of a conjunction "and" and a caesura sign ".", the noun on the other side of the conjunction or the caesura sign can be identified as a feature word. For example, as to the sentence "both the sound quality and the pictures are superior", the word "sound quality" and the word "pictures" are connected by the conjunction "and", and if it is already known that the "sound quality" is a feature word, the word "pictures" can be inferred to be also a feature word.

As another example, as the "lacking" and the "flash" in a phrase "lacking flash" are in a subject-predicate relationship, thus a feature word "flash" can be extracted from therein; and the "performance-price ratio" and the adjective "high" in a phrase "performance-price ratio is high" are in a modification relationship, thus a feature word "performance-price ratio" can be extracted therein.

The required feature words library can be created by using the above ways. For example, the feature words in the feature words library regarding handsets can comprise screen, appearance, pixels, battery, performance-price ratio, photo-taking, weight, and so on.

It should be noted that, in the feature words library, a feature type word can be used to represent a certain type of product features. Feature type word is also a type of feature word. For example, the product features "profile", "looking", "appearance", "shape", "shell", "color", and "appearance" are all indicating the product profile, and can be classified into a same set and represented by "profile". The product features obtained from various data sources (e.g., product specifications, and reviews, etc.) can be clustered by K-Means clustering algorithm, with the feature words representing the same type of features being classified into the same set, and a feature type word capable of representing the set being used to represent the set.

Therefore, according to one embodiment of the invention, the identifying the related product features in each evaluating sentence can contain identifying the related product features in each evaluating sentence with the pre-defined feature words library.

In step 344, the related product features in each feedback of the set of feedbacks are identified.

According to one embodiment of the invention, said identifying the related product features in each feedback of the set of feedbacks can comprise identifying the related product features in each feedback using the pre-defined feature words library.

Taking the set of feedbacks 125 shown in Table 2 as an example, the results of the identifying the related product features in each of the feedbacks 125 of step 344 are shown as the feature words listed in column 3 of Table 4 below.

For example, the feedback 125_1 "the tactile impression of the handset is very good, and the hand feeling is not bad when holding" relates to the feature "profile" of the handset, and the feedback 125_5 "My photo taken by it is very clear, being comparable with a camera" relates to the feature "photo-taking" of the handset.

TABLE 4

The Feedback 125: Product Features, Complimentary/critical polarity and Support

| Serial No. | Feedbacks | Feature words | Complimentary/ critical polarity | Support or not |
|---|---|---|---|---|
| 125_1 | The tactile impression of the handset is very good, and the hand feeling is not bad when holding. | Profile | Positive | Yes |
| 125_2 | I think the appearance of the handset has been obviously improved, and the hand feeling is very good. | Profile | Positive | Yes |

TABLE 4-continued

The Feedback 125: Product Features, Complimentary/critical polarity and Support

| Serial No. | Feedbacks | Feature words | Complimentary/ critical polarity | Support or not |
|---|---|---|---|---|
| 125_3 | The appearance is very fine and compact, and the hand feeling is not bad. | Profile | Positive | Yes |
| 125_4 | I like its profile. | Profile | Positive | Yes |
| 125_5 | My photo taken by it is very clear, being comparable with a camera. | Photo-taking | Positive | No |
| 125_6 | I think the photo taken by it is fairly clear. | Photo-taking | Positive | No |
| 125_7 | Although its photo-taking is not so convenient, the effect of photo-taking is OK. | Photo-taking | Positive | No |
| 125_8 | No flash, however this will not influence its daily use, who will take pictures with a handset in the night? | Photo-taking | Positive | No |
| 125_9 | The battery is too bad, it can only maintain about 2 hrs for Internet access. | Battery | Negative | Yes |
| 125_10 | The battery is also not durable. | Battery | Negative | Yes |
| 125_11 | The standby time of the battery is too short. | Battery | Negative | Yes |
| 125_12 | The battery is not enough. | Battery | Negative | Yes |
| 125_13 | The battery is significantly not durable. Last night I charged it for the whole night but the power is exhausted in less than 2 hrs, depressed. | Battery | Negative | No |
| 125_14 | The sound of the earphone is very low. | Sound | Negative | Yes |
| 125_15 | The sound quality is good when making a call. | Sound Quality | Positive | Yes |
| 125_16 | The performance-price ratio is reasonable. | Performance-price ratio | Positive | Yes |
| 125_17 | The performance-price ratio is high, and it is worth buying. | Performance-price ratio | Positive | Yes |
| 125_18 | Students purchase it more, thinking highly of its performance-price ratio. | Performance-price ratio | Positive | Yes |
| 125_19 | The display of the screen is very good. | Screen | Positive | Yes |
| 125_20 | The resolution of the screen is fair. | Screen | Positive | Yes |
| 125_21 | The screen is big, and it looks very comfortable with Yahei font. | Screen | Positive | Yes |
| 125_22 | Its response is slow, the screen occasionally blurs for short-time. | Performance | Negative | Yes |
| 125_23 | Insensitive and the response of the system is somewhat slow. | Performance | Negative | Yes |
| 125_24 | I think it is not that slow as someone says. | Performance | Positive | No |
| 125_25 | I think the performance is good enough and not slow at all. | Performance | Positive | No |
| 125_26 | The response is very sensitive and the speed is super fast. | Performance | Positive | No |
| 125_27 | Software cannot be installed too much, and the maintenance is inconvenient. | Software | Negative | Yes |
| 125_28 | Many software are not supported. | Software | Negative | Yes |

The contents in column 3 of Table 4 can also be represented by a list of data pairs below: (125_2, profile), (125_3, profile), (125_4: profile), (125_5, photo-taking), (125_6, photo-taking), (125_7, photo-taking), (125_8, photo-taking), (125_9, battery), (125_10, battery), (125_11, battery), (125_12, battery), (125_13, battery), (125_14, sound), (125_15, sound quality), (125_16, performance-price ratio), (125_17, performance-price ratio), (125_18, performance-price ratio), (125_19, screen), (125_20, screen), (125_21, screen), (125_22, performance), (125_23 performance), (125_24, performance), (125_25, performance), (125_26, performance), (125_27, software), (125_28, software).

In step 346, the associations between the evaluating sentences in the review and the feedbacks are built on the basis of the respective related product features.

For example, the feedback 125_28 relates to the product feature "software", and the evaluating sentence 15 "so few application software" also relates to the product feature "software"; thus, the evaluating sentence 15 "so few application software" can be associated with the feedback 125_28 "Many software are not supported". Apparently, one evaluating sentence can be associated with many feedbacks.

In step 348, it is determined whether the evaluating sentence is supported by the associated feedbacks.

For example, for the evaluating sentence 1, there are 4 associated feedbacks, i.e., feedback 125_1, 125_2, 125_3, and 125_4. And all these 4 feedbacks support the evaluating sentence 1.

Figure 4:
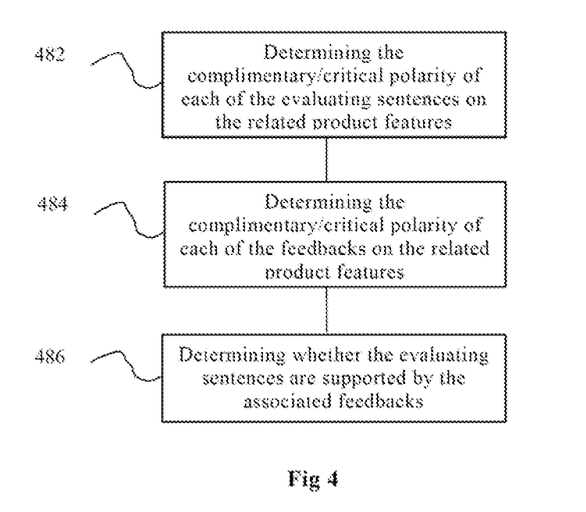
FIG. 4 schematically shows a flow chart of a method in accordance with another embodiment of the present invention.

According to one embodiment of the invention, step 348 can be further realized by the process shown in FIG. 4. The specific embodiment of step 348 will be described below.

The process as shown in FIG. 4 comprises steps 482-486.

In step 482, the complimentary/critical polarity of each evaluating sentence on the related product features is determined.

The complimentary/critical polarity on the related product features refers to the orientation whether the opinion on the related product features is positive or negative. If the opinion is complimentary, the complimentary/critical polarity is called "positive; and if the opinion is critical, the complimentary/critical polarity is called "negative".

In the following, with the comment 120 as an example, various computer implemented embodiments of step 482 will be described.

According to one embodiment of the invention, the complimentary/critical polarity of each evaluating sentence on the related product features can be determined by sentiment analysis techniques.

First, the evaluating sentences in the review are semantically analyzed. The feature word and evaluating word in each evaluating sentence can be associated with each other within a certain window length on the basis of the principle of proximity association, to construct the corresponding review pair. For example, from the feature word "looking" and evaluating word "very nice" in "its looking is very nice", a review pair (profile, nice) can be constructed; and from the feature words "desktop shortcut" and "hidden shortcut" and the evaluating word "great" in "the desktop and hidden shortcuts are great", a review pair (shortcut, great) can be constructed.

It should be noted that, the feature word "looking" corresponding to the evaluating word "nice" in "its looking is very nice" is not a standard feature word, however, in the case that it has already known that the review 120 is a review on handsets, the word "nice" will be usually intended for describing the "profile" of the handsets. As the feature word "profile" is contained in the feature words library of handsets, "profile" can replace "looking" as the feature word in the review pair.

As to the review 120, the following list of review pairs can be constructed: (profile, nice), (shortcut, great), (sensitivity, high), (resolution, fair), (sound, loud), (sound quality, good), (earphone, very good), (screen, not bad), (pictures, bright), (performance-price ratio, reasonable), (Internet-access, convenient), (Internet-access, fast), (system, unstable), (program, crash), (photo-taking, not good), (battery, too small), (gravity-sensing, no), (application software, so few).

Then, the complimentary/critical polarity of the evaluating words in the comment pair is obtained with sentiment analysis technique.

According to one embodiment of the invention, the sentiment analysis technique determines the complimentary/critical polarity of the evaluating word on the related product features in each evaluating sentence with a predefined sentiment dictionary 114, and thus determines the complimentary/critical polarity of each evaluating sentence on the related product features. Each word in the sentiment dictionary is associated with a certain sentiment polarity. The sentiment polarity of the evaluating word can be obtained by matching the evaluating word in the review with the word in the dictionary, and thus the complimentary/critical polarity of the related feature or feature type in the review can be marked. As to the sentiment analysis technique, the following literature can be further referred: "Fully automatic lexicon expansion for domain-oriented sentiment analysis" (http://portal.acm.org/citation.cfm?id=1610125); and "HowNet Sentiment Dictionary" (http://www.keenage.com/).

For example, the complimentary/critical polarity of the evaluating word "nice" in the review pair (profile, nice) is positive, thus, the complimentary/critical polarity of the product feature "profile" is positive and being marked as (profile, positive). For another example, the complimentary/critical polarity of the evaluating word "not good" in the review pair (photo-taking, not good) is negative, thus, the complimentary/critical polarity of the product feature "photo-taking" is negative and being marked as (photo-taking, negative).

With the review 120 as an example, the executed results of step 482 are as shown in column 4 of Table 3.

As shown in col. 4 of Table 3, the review 120 has "positive" evaluation on the following product features: profile, shortcut, sensitivity, screen, sound, sound quality, earphones, performance-price ratio, and Internet access.

Moreover, the review 120 has "negative" evaluation on the following product features: performance, photo-taking, battery, gravity-sensing, and application software. For example, the complimentary/critical polarity of the review 120 on the related product feature "photo-taking" is "negative".

In step 484, the complimentary/critical polarity of each feedback on the related product features is determined.

According to one embodiment of the invention, the complimentary/critical polarity of each feedback on the related product features is determined by a sentiment analysis technique.

According to one embodiment of the invention, the sentiment analysis technique determines the complimentary/critical polarity of the evaluating word on the related product features in each feedback with a pre-defined sentiment dictionary, and thus determines the complimentary/critical polarity of each feedback on the related product features.

The method for determining the complimentary/critical polarity of each feedback on the related product features is similar to the method for determining the complimentary/critical polarity of each evaluating sentence on the related product features in step 482 and thus is omitted here.

With the feedback 125 as an example, the executed results of step 482 are as shown in Column 4 of Table 4.

In step 486, whether the evaluating sentence is supported by the associated feedbacks is determined on the basis of whether the complimentary/critical polarity of the evaluating sentence and the complimentary/critical polarity the feedbacks are consistent.

The results of step 486 are as shown in Column 5 of Table 4.

After a simple counting of the data in Column 5 of Table 4, it can be seen that on the product feature "profile", there are 4 feedbacks supporting the evaluation on the "profile" in the review 120, 4 feedbacks not supporting the evaluation on the "photo-taking" in the review 120, 5 feedbacks supporting the evaluation on the "battery" in the review 120, 1 feedback not supporting the evaluation on the "sound" in the review 120, 1 feedback supporting the evaluation on the "sound quality" in the review 120, 3 feedbacks supporting the evaluation on the "performance-price ratio" in the review 120, 3 feedbacks supporting the evaluation on the "screen" in the review 120, 2 feedbacks supporting the evaluation on the "performance" in the review 120, 3 feedbacks not supporting the evaluation on the "performance" in the review 120, and 2 feedbacks supporting the evaluation on the "software" in the review 120.

Column 4 of Table 4 can be further expressed with the following Table 5.

TABLE 5

| Features in the review f | Total Number of the related feedbacks T | Number of the Supporting feedbacks S | Number of the Non-supporting feedbacks NS |
|---|---|---|---|
| Profile | 4 | 4 | |
| Sound | 1 | | 1 |
| Sound quality | 1 | 1 | |
| Screen | 4 | 4 | |
| Performance | 5 | 2 | 3 |
| Photo-taking | 4 | | 4 |
| Battery | 5 | 5 | |
| Software | 2 | 2 | |
| Performance-price ratio | 3 | 3 | |

In table 5, the "features in the review f" of Column 1 represents the feature words of the related product features in the review 120, and the "total number of the related feedbacks T" of Column 2 represents the mentioned times of the product features shown in Column 1 in the feedback 125. For example, the related product feature "performance" in the review 120 is mentioned 5 times in the feedback 125, and thus being recorded as $T(f)=T(performance)=5$. The "number of the supporting feedbacks S" of Column 3 represents the number of feedbacks supporting the evaluation on the corresponding product feature in the review 120. For example, in the feedback 125, there are 2 feedbacks supporting the evaluation on the "performance" in the review 120, and thus being recorded as $S(f)=S(performance)=2$. The "number of the non-supporting feedbacks NS" of Column 4 represents the number of feedbacks not supporting the evaluation on the corresponding product feature in the review 120. For example, in the feedback 125, there are 3 feedbacks not supporting the evaluation on the "performance" in the review 120, and thus being recorded as $NS(f)=NS(performance)=3$.

It should be noted that, the product features not mentioned in the feedback 125 are omitted in Table 5.

In implementing the various embodiments of the invention, the data shown in Table 5 can be flexibly used.

Now turning back to step 204 shown in FIG. 2, this step calculates the support degree of each of the evaluating sentences by a set of feedbacks.

The above support degree can be flexibly defined by the data shown in Table 5.

Scheme I, the support degree can be defined as the magnitude of the number of the supporting feedbacks $S(f)$ shown in Column 3 of Table 5.

With the data shown in Table 5 as an example, the features in the review f are arranged in an order according to the magnitude of the number of the supporting feedbacks $S(f)$ as follows:

battery, profile, screen, performance-price ratio, performance, application software, sound quality, sound, photo-taking.

Scheme II, the support degree can be defined as the difference between the number of the supporting feedbacks S shown in Column 3 and the number of the non-supporting feedbacks NS in Column 4, i.e., $S(f)-NS(f)$.

With the data shown in Table 5 as an example, the features in the review f are arranged in an order according to the magnitude of the difference $S(f)-NS(f)$ between the number of the supporting feedbacks S and the number of the non-supporting feedbacks NS as follows:

battery, profile, screen, performance-price ratio, application software, sound quality, performance, sound, photo-taking.

Compared with scheme I, the arranging position of "performance" is moved backward.

Scheme III, the support degree is defined as $S(f)*T(f)$, and this scheme takes into account the attention degree of the feedbacks on the related product features in the review. The higher the $T(f)$, the higher the attention degree on the product feature f, and in this sense, the evaluation on the corresponding product feature in the review are more representative.

The features in the review f are arranged in an order according to the magnitude of $S(f)*T(f)$ as follows:

battery, profile, screen, performance, performance-price ratio, application software, sound quality, sound, photo-taking.

Compared with schemes I and II, ordering of the product feature "performance" is advanced. This is because that the definition $S(f)*T(f)$ of the support degree in scheme III takes into account the number of the feedbacks $T(f)$ related to the product feature. For example, in the feedback 125, there are 5 feedbacks related to the product feature "performance", which indicates that the product feature "performance" is of relatively higher attention degree in the feedback 125 by other users.

Scheme IV, the support degree is defined as $(S(f)-NS(f))*T(f)$. Accordingly, the features in the review f are arranged in an order according to the magnitude of $(S(f)-NS(f))*T(f)$ as follows:

battery, profile, screen, performance-price ratio, application software, sound quality, sound, photo-taking, performance.

The snippet generated for the review 120 by step 206 shown in FIG. 2 can be slightly different according to different schemes. For example, according to the schemes I or II or IV, the generated snippet is:

"the battery capacity is only 1000 mA which is too small, its looking is very nice, the display effect of the screen is not bad, the performance-price ratio is reasonable."

However, according to the scheme III, the generated snippet is:

"the battery capacity is only 1000 mA which is too small, its looking is very nice, the display effect of the screen is not bad, the system is unstable, sometimes the programs end automatically, and occasionally crash."

While based on the method for extracting snippet in prior art, the snippet generated for the review shown in Table 1 can be: "Recently I bought a Y-Model handset of Company X newly coming into the market, and after having used it for half a month, I finally find out its "temper" and can like to say something about it here."

In comparison, the snippet generated for the review 120 by the method according to the embodiments of the invention apparently can reflect the opinions (of other users) on the comments on the various product features in the review 120 more concisely and objectively.

The various embodiments of the computer-implemented method for generating snippet for review on the Internet according to the invention have been illustrated above in combination with the drawings. The system 100 for generating snippet for review on the Internet shown in FIG. 1 can be expanded according to the same inventive conception.

According to one embodiment of the invention, the support degree calculating means 104 can include: a feature identifier configured to identify the related product feature of the each evaluating sentence and the related product feature of each feedback of the set of feedbacks; an association means configured to build the association between the evaluating sentence and the feedback on the basis of the respective related product features; and a support determining means configured to determine whether the evaluating sentence is supported by the associated feedbacks.

According to one embodiment of the invention, the support determining means can include: a polarity classifier configured to determine the complimentary/critical polarities of each evaluating sentence and each feedback on the related product features, where the support determining means determines whether the evaluating sentence is supported by the associated feedbacks on the basis of whether the complimentary/critical polarities of the evaluating sentence and the feedbacks are consistent.

According to one embodiment of the invention, the feature identifier can identify the related product feature of each evaluating sentence using a pre-defined feature words library.

According to one embodiment of the invention, the feature identifier can identify the related product feature of each feedback of the set of feedbacks using a pre-defined feature words library.

According to one embodiment of the invention, the polarity classifier can determine the complimentary/critical polarity of each evaluating sentence on the related product feature using a sentiment analysis technique.

According to one embodiment of the invention, the polarity classifier can determine the complimentary/critical polarity of each evaluating sentence on the related product feature using a sentiment analysis technique.

According to one embodiment of the invention, the sentiment analysis technique determines the complimentary/critical polarity of evaluating word on the related product feature in each evaluating sentence with a pre-defined sentiment dictionary. Thus determines the complimentary/critical polarity of each evaluating sentence on the related product feature.

Similarly, the polarity classifier can determine the complimentary/critical polarity of each feedback on the related product features by the sentiment analysis technique. Also, the sentiment analysis technique determines the complimentary/critical polarity of evaluating word on the related product feature in each feedback with the pre-defined sentiment dictionary, and thus determines the complimentary/critical polarity of each feedback on the related product feature.

The system for generating snippet for review on the Internet in accordance with the various embodiments of the invention has been described above, as the computer-implemented method for generating snippet for review on the Internet in accordance with the various embodiments of the invention has been described in detail above, thus in the above description of the system, the obvious duplication with the method described, or the contents derived easily from the description of the method are omitted.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for generating snippet for review on the Internet, the system comprising:
    a memory having computer readable computer instructions; and
    a processor for executing the computer readable instructions to perform a method comprising:
    a receiving instruction configured to receive a review and a set of feedbacks corresponding to said review, wherein said review comprises a plurality of evaluating sentences that evaluates product features of a product;
    a support degree calculating instruction configured to calculate support degrees of each of said plurality of evaluating sentences in the review, the support degrees calculated based on an evaluation of the set of feedbacks corresponding to the review; and
    a snippet generating instruction configured to:
        (1) extract, by relying on calculated support degrees of each of said evaluating sentences, at least one of said evaluating sentences from said plurality of evaluating sentences; and
        (2) designate extracted evaluating sentence as a snippet of said review.

2. The system according to claim 1, wherein the support degree calculating instruction comprises:
    a feature identifier configured to identify related product features in each of said evaluating sentences and said related product features in each feedback of said set of feedbacks;
    an association instruction configured to associate said evaluating sentences in said review with said feedbacks by relying on said respective related product features; and
    a support determining instruction configured to determine whether said evaluating sentences are supported by associated feedbacks.

3. The system of claim according to claim 1, wherein the support determining instruction comprises:
    a polarity classifier configured to determine complimentary/critical polarity of each of said evaluating sentences on said related product features and complimentary/critical polarity of each of said feedbacks on said related product features;
    wherein said support determining instruction determines whether said evaluating sentences are supported by said associated feedbacks by evaluating said complimentary/critical polarity of said evaluating sentence and said complimentary/critical polarity of said feedback.

4. The system according to claim 2, wherein said feature identifier identifies said related product features in each of said evaluating sentences with a pre-defined feature words library.

5. The system according to claim 2, wherein said feature identifier identifies said related product features in each said feedback of said set of feedbacks with a pre-defined feature words library.

6. The system according to claim 3, wherein said polarity classifier determines said complimentary/critical polarity of each of said evaluating sentences on the related product features by using a sentiment analysis technique.

7. The system according to claim 6, wherein said sentiment analysis technique determines complimentary/critical polarity of evaluating words in each of said evaluating sentences on said related product features with a pre-defined sentiment dictionary.

8. The system according to claim 3, wherein said polarity classifier determines said complimentary/critical polarity of each of said feedbacks on said related product features by a sentiment analysis technique.

9. The system according to claim 8, wherein said sentiment analysis technique determines complimentary/critical polarity of evaluating words in each of said feedbacks on said related product features with a pre-defined sentiment dictionary.

* * * * *